Dec. 27, 1955 E. FALKENTHAL 2,728,809

METHOD OF MANUFACTURING PHOTOELECTRIC CELLS

Filed Aug. 2, 1951

Inventor:

Erwin Falkenthal

United States Patent Office 2,728,809

Patented Dec. 27, 1955

2,728,809

METHOD OF MANUFACTURING PHOTOELECTRIC CELLS

Erwin Falkenthal, Berlin-Dahlem, Germany

Application August 2, 1951, Serial No. 239,910

1 Claim. (Cl. 136—89)

Figure 1:
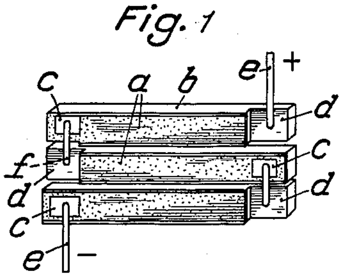

This invention refers to a laminated photoelectric cell consisting of a great number of extremely small strip-shaped individual elements which are arranged side by side on a flat or curved surface and connected in series. By this series connection the delivered voltage is increased and, at the same time, the capacity of the cell is diminished. The individual elements of the cell are advantageously designed so narrow or so small, that their surface is only a few square millimeters—e. g. 5–20 sq. mm.—and that the cell is built up of many individual elements, e. g. 6 or 10 individual elements, in certain cases even a multiple of that. Thus, the invention may be employed, not only for the reproduction of sound records but also for transforming the energy of higher frequencies and smaller amplitudes, e. g. for the reproduction of certain recorded A. C.-phenomena, for picture transmission, for television, for high frequency-carrier oscillations modulated by means of low frequency, etc.

The object of this invention is a new and useful method of manufacturing photoelectric cells of the kind described consisting of a plurability of very small individual strip-shaped cells arranged side by side in a flat plane. This manufacturing method comprises the following steps: A large laminated cell is made by applying a thin semiconductive light sensitive layer to a conductive base plate to form the base electrode, and applying over the semiconductive layer a thin transparent conductive covering layer to form the current-delivering electrode. Then, a small strip-shaped portion of said semi-conductive light-sensitive layer and said transparent covering layer is removed along one margin of said large cell, and a contact strip is provided along the other margin. After this, said large laminated cell is cut into a plurability of narrow individual cells which are then mounted upon a carrier of insulating material parallel to one another in such a manner that each end prepared by removing a portion of said semi-conductive layer is placed besides the contact strip covered nonprepared end of the adjacent narrow individual cell. At last, the base plate, at the prepared end of each individual cell, is connected with the contact strip covered end of the adjacent individual cell.

Figure 2:
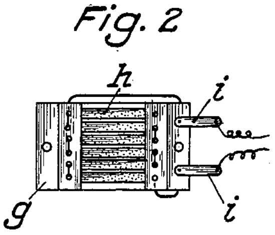
Figure 2A:
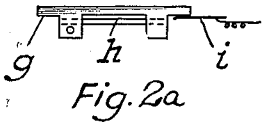
Figure 3:
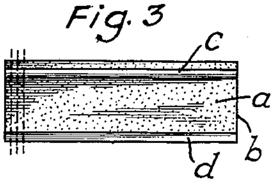
Figure 3A:
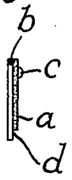

In the drawing:

Fig. 1 shows—in an enlarged size—a front-view of a cell of the kind described consisting of three individual cells, Figs. 2 and 2*a* show—in a less enlarged size—a front-view and a cross-section of a cell consisting of six individual cells, Figs. 3 and 3*a* show—in a natural size—a front-view and a cross-section of the original large laminated cell before it is cut into the individual cells.

According to Fig. 1 the covering electrode with the semi-conductor is partly removed at one of the cell ends; thus, each of the individual cells can be united with the neighbour cell by a straight electrical connection between the contact plate *c* of its covering electrode and the base electrode *b* of the adjacent cell element if the individual cells are arranged as shown in the drawing. This connection then is arranged alternately at the left and at the right end of the individual strips. In this way each of the base electrodes is connected with the covering electrode of the next cell element and so on.

According to Figs. 2 and 3 the narrow distances between the small elements are secured by means of small screws or, in case of need, by thin insulating intermediate layers. The connection of the multiple cell is accomplished by means of soldering terminals *i* two of which are shown in the drawing; however, still further connections can be provided for employing, eventually, only parts of the multiple cell and thus to achieve a regulation of the delivered cell voltage. When choosing the intermediate layers mentioned before, they have to be made of materials with a small dielectric constant if the intermediate layers should not be removed after mounting and lacquering.

According to Figs. 4 and 5 small individual cells can be cut from it by sawing, milling, engraving, or in any other way and can be employed, if sufficiently sharp tools are used, directly for building up a multiple cell. In this case, the individual cells have the advantage of all having the same characteristics as to current, voltage, and spectral sensibility and, therefore, resulting in a maximal effect within the multiple cell if there is provided an even illumination.

I claim:

A method of manufacturing photoelectric cells made up of a plurality of very small individual strip-shaped cells arranged side by side in a flat plane and connected in series for achieving small capacity and high voltage, said method consisting in making a large laminated cell by applying a thin semi-conductive light sensitive layer to a conductive base plate to form the base electrode, applying over the semi-conductive layer a thin transparent conductive covering layer to form the current-delivering electrode, removing a small strip-shaped portion of said semi-conductive light-sensitive layer and said thin transparent conductive covering layer along one margin of said large cell and providing a contact strip along the other margin, cutting said large laminated cell into a plurality of narrow individual cells, mounting said individual laminated cells upon a carrier of insulating material parallel to one another in such a manner that each end prepared by removing a portion of said semi-conductive layer and said conductive covering layer is placed besides the contact strip covered non-prepared end of the adjacent narrow individual cell, and electrically connecting the base plate at the prepared end of each individual cell with the contact strip covered end of the adjacent individual cell.

References Cited in the file of this patent

UNITED STATES PATENTS

| | | |
|---|---|---|
| 1,803,000 | Campbell | Apr. 28, 1931 |
| 2,000,642 | Lamb (I) | May 7, 1935 |
| 2,137,831 | Brunke | Nov. 22, 1938 |
| 2,172,200 | Hein | Sept. 5, 1939 |
| 2,305,576 | Lamb (II) | Dec. 15, 1942 |
| 2,428,537 | Veszi | Oct. 7, 1947 |
| 2,543,048 | Nachod | Feb. 27, 1951 |

FOREIGN PATENTS

| | | |
|---|---|---|
| 641,081 | Germany | Jan. 20, 1937 |
| 655,927 | Germany | Jan. 26, 1938 |
| 204,535 | Germany | Nov. 17, 1908 |